United States Patent
Harada et al.

(10) Patent No.: US 7,124,005 B2
(45) Date of Patent: Oct. 17, 2006

(54) ELECTRONIC CONTROL UNIT HAVING HOLD CIRCUIT AND METHOD THEREFOR

(75) Inventors: Takashi Harada, Hekinan (JP); Nobutomo Takagi, Okazaki (JP); Noriaki Terashima, Okazaki (JP); Yasuhiro Tanaka, Kariya (JP)

(73) Assignee: Denso Corporation, Kariya (JP)

( * ) Notice: Subject to any disclaimer, the term of this patent is extended or adjusted under 35 U.S.C. 154(b) by 144 days.

(21) Appl. No.: 10/909,532

(22) Filed: Aug. 3, 2004

(65) Prior Publication Data

US 2005/0033494 A1  Feb. 10, 2005

(30) Foreign Application Priority Data

Aug. 7, 2003  (JP)  ............... 2003-289041
Aug. 8, 2003  (JP)  ............... 2003-290436

(51) Int. Cl.
    *G06F 19/00*  (2006.01)
(52) U.S. Cl. ..................................... 701/36
(58) Field of Classification Search ............ None
    See application file for complete search history.

(56) References Cited

U.S. PATENT DOCUMENTS

| 4,708,108 A | * | 11/1987 | Sakamoto et al. ..... 123/339.27 |
| 4,807,135 A | * | 2/1989 | Tamai .................... 701/36 |
| 4,888,697 A | * | 12/1989 | Hemminger et al. ........ 701/114 |
| 4,951,210 A | * | 8/1990 | Fukami .................. 701/114 |
| 5,222,468 A | * | 6/1993 | Korenaga ............... 123/198 B |
| 5,412,942 A | * | 5/1995 | Mukai et al. .............. 60/276 |
| 5,521,535 A |   | 5/1996 | Hori |
| 5,841,301 A | * | 11/1998 | Horie et al. ............... 327/100 |
| 6,219,598 B1 | * | 4/2001 | Miwa et al. ................ 701/36 |
| 6,708,101 B1 | * | 3/2004 | Umemoto .................. 701/102 |
| 2004/0012503 A1 |   | 1/2004 | Takebe et al. |

FOREIGN PATENT DOCUMENTS

JP  A-4-195243  7/1992

* cited by examiner

*Primary Examiner*—Michael J. Zanelli
(74) *Attorney, Agent, or Firm*—Posz Law Group, PLC (57) ABSTRACT

When a microcomputer is automatically reset due to uncontrollable process and recovers from reset, a cancel pulse signal is outputted from the microcomputer to a hold circuit to stop supply of a driving current to a relay. This pulse is generated, when a predetermined condition indicative of possibility of battery rundown lasts for a predetermined time. The predetermined condition includes that a hold set condition is detected based on a status signal inputted from the hold circuit; a card key is present in a key slot; a key verification inputted from an immobilizer ECU is not available; a vehicle speed is zero; and an engine revolution is zero.

19 Claims, 5 Drawing Sheets

ELECTRONIC CONTROL UNIT HAVING HOLD CIRCUIT AND METHOD THEREFOR

CROSS REFERENCE TO RELATED APPLICATION

This application is based on and incorporates herein by reference Japanese Patent Applications No. 2003-289041 filed on Aug. 7, 2003 and No. 2003-290436 filed on Aug. 8, 2003.

FIELD OF THE INVENTION

The present invention relates to an electronic control unit containing a hold circuit which changes a signal level in response to trigger signals, and the like.

BACKGROUND OF THE INVENTION

Various electronic control units (ECUs), for example in-vehicle ECUs mounted on vehicles, are known. Each ECU comprises a microcomputer and the like. The electrical output of the microcomputer sometimes become contrary to intention by noise, leakage, malfunction, or the like.

In U.S. Pat. No. 5,521,535 (JP-A-7-114869), when a trigger signal is inputted, a hold circuit (self hold circuit) changes its output level to a predetermined level. After the trigger signal disappears, the hold circuit keeps holding the predetermined output level. Where a control signal is outputted as a trigger signal from a microcomputer to the hold circuit, the state of output from the hold circuit remains unchanged even when the microcomputer itself is reset. Therefore, even when the microcomputer returns to the normal state, the state in which the output of the hold circuit should be cannot be determined.

For instance, a power supply ECU controls the state of the passage of current through feeder lines from a battery mounted on a vehicle to various parts of in-vehicle devices. It is assumed that the power supply ECU has a hold circuit and that power supply control signals are outputted to an accessory (ACC) relay and an ignition (IG) relay through the hold circuit. In this case, the microcomputer in the power supply ECU recovers from reset (released from reset) and turns off output without limitation. Even though the vehicle is running, there is a possibility that power supply to a power train system including an engine is suddenly stopped and it becomes uncontrollable. When the microcomputer recovers from reset and maintains output without limitation, power supply is kept on even though the vehicle is parked. This causes battery rundown.

These problems are especially remarkable when a hold circuit is provided. When no hold circuit is provided, however, inappropriate control signals being outputted is problematic. This situation takes place when the output is turned on by noise, leakage, malfunction, or the like without human intervention. This situation arises not only when the microcomputer is reset but also when, for example, the microcomputer is in low-power consumption state, such as a sleep state.

Therefore, when such a hold circuit is applied to a device calling for high reliability and safety, such as in-vehicle device, a separate circuit must be provided for ensuring reliability and safety. This results in the increased scale of device.

SUMMARY OF THE INVENTION

It is therefore a first object of the present invention to provide an electronic control unit, wherein when the state of output to a controlled object is made contrary to intention by the influence of noise or the like, it can be detected and corrected to appropriate state.

For attaining the first object, an electronic control unit (ECU) is fed with information from external devices and is capable of outputting control signals to a controlled object. Further, a state propriety determination part determines the propriety of state of control signals outputted to the controlled object based on at least information from external devices. When the state propriety determination part determines that the state of a control signal is inappropriate, a signal state control part carries out control so as to bring the control signal into appropriate state.

Therefore, even when the state of output to the controlled object is contrary to intention due to the influence of noise, leakage, malfunction, or the like, it can be detected and corrected to appropriate state. Even when used in an environment with much noise, the ECU is effective in ensuring the reliability and safety of a system including the ECU and the controlled object.

Such an ECU comprises a microcomputer which carries out, for example, state propriety determination and signal state control and a hold circuit wherein a signal level held therein is changed by input of a hold signal or a cancel signal from the microcomputer. The ECU is so constructed that control signals are outputted from the hold circuit to the controlled object. Provision of such a hold circuit is effective, for example, in controlling the state of passage of current through feeder lines.

More specifically, when a hold circuit is not provided and such a construction that power supply is stopped when the state of the control signal from the microcomputer is changed from ON to OFF is adopted, a problem arises. Even when power supply must be maintained, it is readily stopped when the control signal from the microcomputer is turned off by noise or the like. Meanwhile, the hold circuit brings the following advantage: once a hold signal for turning on power supply is outputted, thereafter it is not turned off unless a cancel signal for turning it off is outputted. Especially, in case the state of power supply to the power train system of a vehicle is controlled, this is favorable because power supply is prevented from being unintentionally turned off during driving.

However, even when such a hold circuit is present, a problem arises in the following case: for example, the microcomputer is automatically reset due to uncontrollable process or the like and then recovers from reset (released from reset). When the microcomputer outputs a cancel signal for turning off output without limitation at this time, a problem arises: power supply to the power train system is suddenly stopped even though the vehicle is running, and it becomes uncontrollable. To cope with this, such a construction that the state of control signals outputted from the hold circuit can be grasped is adopted. Then, especially, when the microcomputer is released from reset, state propriety determination is made also based on the state of control signals outputted from the hold circuit. Thus, appropriate measures can be taken.

Further, while the microcomputer is in sleep state, state propriety determination is made at regular or irregular intervals. When the state of a control signal is inappropriate, control can be carried out so as to bring the control signal into appropriate state. As an example, it is assumed that the state of power supply from an in-vehicle battery to in-vehicle devices is controlled. One of possible cases where the microcomputer in an ECU for carrying out such control is in sleep state is a case where the vehicle is parked. When power is supplied due to noise or the like in this case, battery rundown can result. To cope with this, the determination is made at regular or irregular intervals while the microcomputer is in sleep state. Thus, even when transition to power supply state is unintentionally made, power supply can be stopped. This is effective in terms of the prevention of battery rundown and the like.

The above state propriety determination is carried out as follows: the determination of impropriety is made only when a state in which one or more conditions for the determination of impropriety lasts for a predetermined time or longer, for example. This enhances the reliability of determination.

Where the hold circuit is present, the remarkable effect is brought about, as mentioned above. When a hold circuit is not present, however, it is also effective to make the above determination or take the above measures when the microcomputer is released from reset or in sleep state.

With respect to state propriety determination, for example, the following construction may be adopted: with increase in the relative degree of the influence of the impropriety of control signals on the controlled object, the number of conditions used in the determination of impropriety is increased. For instance, where the power supply from an in-vehicle battery to the equipment in a vehicle power train system, it is believed that the degree of influence when the vehicle is running or waiting is higher than when the vehicle is parked. Therefore, the number of criteria is increased to make more reliable determination.

The ECU according to the present invention is expected to be mounted on a vehicle. Since in-vehicle devices are used in an environment with much noise, the present invention is particularly effective. Especially, when the ECU is used to control the state of power supply from the in-vehicle battery, the following advantages are brought about: power supply can be prevented from being suddenly stopped due to noise or the like when the vehicle is running; and power supply is prevented from uselessly continuing when the vehicle is parked. Thus, the safety and reliability of vehicles are secured.

The ECU is also applicable to an apparatus or a system other than vehicles. When used in an environment with much noise, the ECU is similarly very effective. Where the ECU is used to control the state of power supply from the in-vehicle battery, as information from external devices on which state propriety determination is based, information effective in inferring that the vehicle is parked is used. Though it is inferred that the vehicle is parked, the state of the control signal can be determined inappropriate by state propriety determination because power is being supplied. In this case, the signal state control part controls the control signal so as to stop the power supply. This is effective in preventing the battery rundown.

It is a second object of the present invention to provide an electronic control unit (ECU) which is less prone to malfunction due to an erroneous output of software which sporadically occurs or noise.

For attaining the second object, when a preset number or more of pulse signals are inputted during a preset period, a trigger signal generation circuit generates a trigger signal. The signal level a hold circuit holds is changed by the input of the trigger signal generated by the trigger signal generation circuit. That is, the trigger signal generation circuit is prevented from generating a trigger signal due to a sporadic erroneous output of software or noise (noise or the like).

The hold circuit is provided with a plurality of input terminals (e.g. set/reset). The signal level held when a trigger signal is inputted is different from input terminal to input terminal. In this case, it is preferable that the trigger signal generation circuit should be provided for each input terminal.

The preset period and preset number of pieces for the trigger signal generation circuit can be set with the features of noise produced in the place of use of the unit taken into account. For example, where burst noise is produced, the preset number of pieces is sufficiently increased.

As the trigger signal generation circuit, for example, a frequency/voltage conversion circuit can be used, which generates output signals having a signal level corresponding to the pulse interval (pulse frequency) of pulse signals. In this case, the output signal of the frequency/voltage conversion circuit can be directly used as a trigger signal.

Specifically, the frequency/voltage conversion circuit can be constructed using a capacitor charged by a pulse signal and a discharge circuit which discharges the capacitor at a certain rate, for example. The conversion circuit is constructed to generate output signals (i.e. trigger signals) having a signal level corresponding to the charging voltage for the capacitor.

In this case, the setting (preset period, preset number of pieces) related to the pulse signal can be appropriately determined so that the following will be implemented: before the electric charges charged in the capacitor by a pulse signal are all discharged by the discharge circuit, the next pulse signal is inputted, and at the same time, a signal level which meets conditions defining trigger signal is obtained.

The trigger signal generation circuit may comprise, for example, a counter which counts inputted pulse signals and generates a trigger signal when the count reaches a preset threshold value; and a free-run timer which generates a signal for resetting the counter at preset intervals. In this case, the trigger signal generation circuit can be constructed of a logic circuit; therefore, it can be constructed as a semiconductor integrated circuit. This is suitable for cases where the unit must be reduced in size. When the hold circuit is also constructed of a logic circuit, such as an RS flip-flop circuit, the size of the unit can be further reduced.

The ECU can be incorporated into, for example, an in-vehicle device used in an environment with much noise. Especially, when the output of the hold circuit is used as a control signal for controlling the state of passage of current through the feeder lines installed in a vehicle, the following advantages are brought about: power supply is prevented from being abruptly stopped by noise or the like when the vehicle is running, and the safety and reliability of the vehicle can be sufficiently ensured.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT (First Embodiment)

Figure 1:
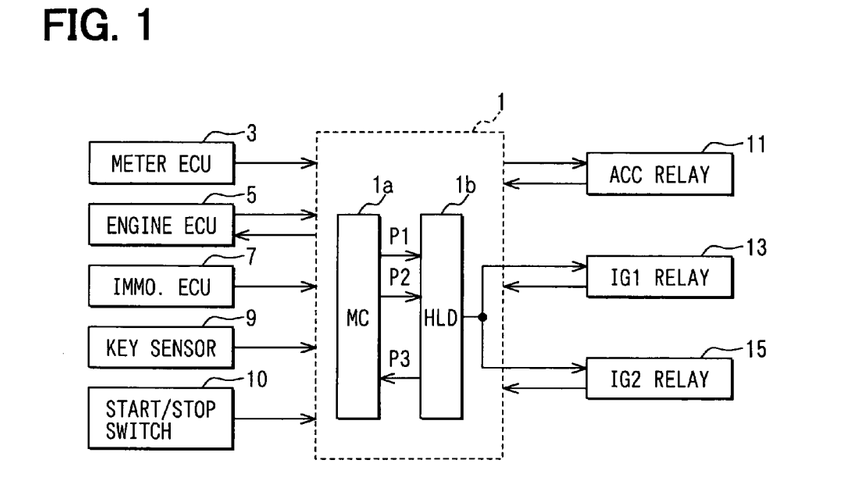
FIG. 1 is a schematic diagram of a power supply control system as first embodiment of the present invention.

Referring first to FIG. 1, an in-vehicle power supply control system comprises: a power supply electronic control unit (ECU) 1 which is installed in the vehicle; a meter ECU 3, an engine ECU 5, and an immobilizer ECU 7 which are connected with the power supply ECU 1; a key sensor 9 for inserting a card key (not shown); a start/stop switch 10 which is a pushbutton switch for inputting commands instructing start or stop of power supply; an accessory (ACC) relay 11; a first ignition (IG1) relay 13; and a second ignition (IG2) relay 15. The relays 11, 13 and 15 are controlled objects.

The meter ECU 3 is for displaying on a display unit varying status of the vehicle, including vehicle speed, engine speed, opening/closing of doors, and the shift range of a transmission device. The meter ECU 3 outputs vehicle speed information to the power supply ECU 1.

The engine ECU 5 is an engine controller which controls an engine, and outputs engine speed information to the power supply ECU 1.

The immobilizer ECU 7 is connected with a tuner ECU (not shown), and verifies ID code obtained by receiving and decoding radio waves transmitted from an electronic key (not shown) carried by the user. When the ID code is successfully verified, the immobilizer ECU 7 gives the power supply ECU 1 permission to start the engine. Then, the immobilizer ECU 7 outputs the result of key verification, OK (verification succeeded) or NG (verification failed) to the power supply ECU 1.

In this embodiment, power supply from an in-vehicle battery (not shown) to in-vehicle equipment is not controlled by turning an ignition key inserted into a key cylinder. Instead, in this embodiment, with a card key (not shown) inserted into the key sensor 9, the start/stop switch 10 is pressed. Then, the power supply ECU 1 switches the on/off state of the ACC relay 11, IG1 relay 13, and IG2 relay 15, and thereby the state of power supply to the various parts of the in-vehicle equipment is changed. The key sensor 9 outputs a signal indicating the presence or absence of the key to the power supply ECU 1.

The power supply ECU 1 comprises a microcomputer 1a, a hold circuit 1b, and the like. The microcomputer 1a comprises: a port for outputting hold pulse signal P1 as "hold signal"; a port for outputting cancel pulse signal P2 as "cancel signal"; a port for inputting status signal P3 (signal indicating whether in hold set state or in cancel state) which indicates the status of the hold circuit 1b; a port for outputting control signals to the ACC relay 11; a port for outputting control signals to the engine ECU 5; and the like. The power supply ECU 1 is so constructed that, when the start/stop switch 10 is pressed with the card key in the key sensor 9, control signals are outputted to the ACC relay 11, IG1 relay 13, IG2 relay 15, and engine ECU 5.

The hold circuit 1b is connected only with the IG1 relay 13 and the IG2 relay 15. The IG1 relay 13 is a relay for supplying power to in-vehicle equipment, such as power windows. The IG2 relay 15 is a relay for supplying power to the in-vehicle equipment, such as the engine ECU, in the power train system. When a hold pulse signal P1 is inputted from the microcomputer 1a, the hold circuit 1b generates a hold trigger signal. When this hold trigger signal is generated, the hold circuit 1b starts supplying driving current to both the IG1 relay 13 and the IG2 relay 15. After the hold trigger signal disappears as well, the hold circuit 1b keeps supplying driving current. When a cancel pulse signal P2 is inputted from the microcomputer 1a, the hold circuit 1b generates a cancel trigger signal. When this cancel trigger signal is generated, the hold circuit 1b stops supplying driving current to the IG1 relay 13 and the IG2 relay 15.

Therefore, in normal state in which the influence of noise or the like is not present, the hold circuit 1b starts supplying driving current when a hold pulse signal P1 is inputted from the microcomputer 1a. Thereafter, the hold circuit 1b keeps supplying driving current until a cancel pulse signal P2 is inputted. This state in which driving current is being supplied is designated as "hold set state," and the state in which supply of driving current is in a stop is designated as "cancel state." Whether in hold set state or in cancel state corresponds to "state of control signal."

If the hold circuit 1b is not present and supply of driving current to the IG1 relay 13 and the IG2 relay 15 is controlled by control signals outputted from the microcomputer 1a, a problem arises. Specifically, even when power supply must be maintained, it is easily stopped when a control signal from the microcomputer is turned off by noise or the like. This situation should not take place when the vehicle is running. With the hold circuit 1b, this situation does not take place. Once the hold signal P1 is outputted from the microcomputer 1a, supply of driving current is thereafter maintained unless the cancel signal P2 is outputted. This is favorable because power supply is prevented from being unintentionally stopped when the vehicle is running.

However, even when such a hold circuit 1b is present, the microcomputer 1a may be automatically reset due to uncontrollable process or the like and then recovers from reset (is released from reset). When the microcomputer 1a outputs the cancel pulse signal p2 without limitation at this time, power supply to the power train system is instantly stopped even though the vehicle is running, and it becomes uncontrollable.

Further, when the vehicle is parked, for example, the microcomputer 1a transitions into sleep state. When power is unintentionally supplied due to noise or the like when the vehicle is parked, battery rundown can result.

Figure 2:
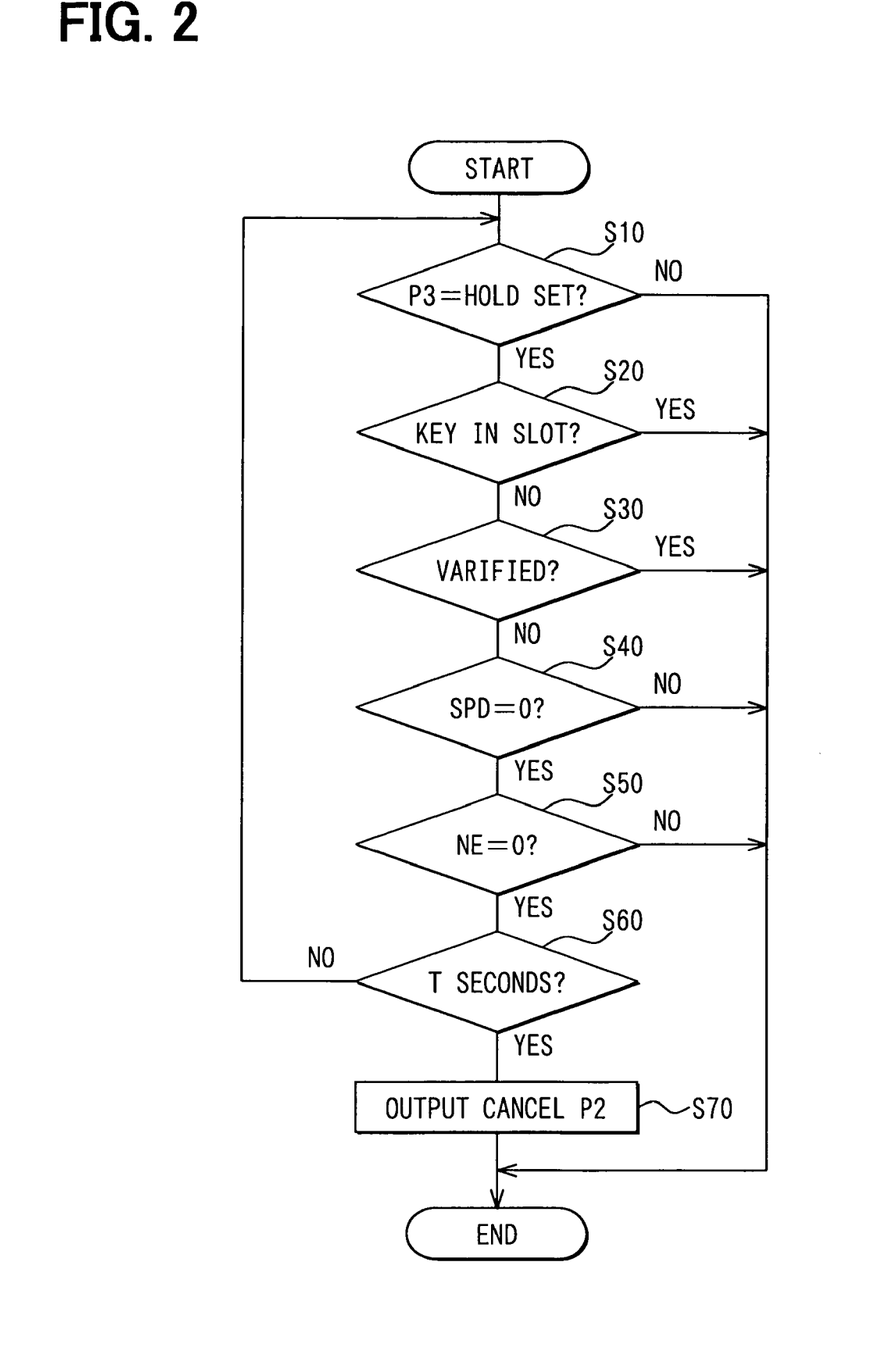
FIG. 2 is a flowchart illustrating power supply control processing carried out when a microcomputer is released from reset in the first embodiment.

To cope with this, the power supply ECU 1 in this embodiment performs the power supply control processing. The microcomputer 1a comprises CPU, ROM, RAM, and the like and is of publicly known configuration. The power supply control processing is executed as shown in FIG. 2 based on programs stored in the ROM.

The power supply control processing is carried out by the when the microcomputer 1a is released from reset.

At step 10 (S10) to step 60, six different determinations are made, and only when the conditions for the determinations are all met, the cancel pulse signal P2 is outputted to the hold circuit 1b at step 70. If any of the five conditions for step 10 to step 50 is not met, the power supply control processing is terminated without performing the processing of step 70. When the five conditions for step 10 to step 50 are all met, the operation proceeds to step 70 only when that state lasts for a predetermined time, T seconds. Then, the cancel pulse signal P2 is outputted. Then, the operation returns to step 10 and the determinations are repeated until the five conditions are met and that state lasts for T seconds.

At step 10, whether hold set is detected or not is determined based on a status signal P3 inputted from the hold circuit 16. The status signal P3 is a signal which indicates whether the hold circuit 1b is in hold set state or in cancel state. The determination is made by inputting the status signal P3. When hold set is not detected (step 10: NO), driving current is not supplied from the start. Thus, the output of cancel pulse signal P2 is unnecessary. Consequently, the power supply control processing is terminated without performing the processing of the following steps.

If hold set is detected (step 10: YES), the operation proceeds to step 20, in which whether a card key is present in the key slot is determined based on a signal indicating the presence or absence of key, inputted from the key sensor 9. When a card key is present in the key slot (step 20: YES), that indicates that the driver is in the vehicle or the vehicle is in a short-time stop though the driver is not actually in the vehicle. In this case, it is supposed that outputting the cancel pulse signal P2 is unnecessary. Therefore, the power supply control processing is terminated without performing the processing of the following steps.

If no card key is present in the key sensor 9 (step 20: NO), the operation proceeds to step 30, in which determination is made based on the result of key verification inputted from the immobilizer ECU 7. When the result of key verification is OK (verification succeeded), the ID code obtained from an electronic key carried by the user is successfully verified. In this case, it is supposed that outputting the cancel pulse signal P2 is unnecessary. Therefore, the power supply control processing is terminated without performing the processing of the following steps.

If the result of key verification is NO (verification failed), the operation proceeds to step 40. Then, whether a vehicle speed SPD is zero (0) or not is determined based on vehicle speed information inputted from the meter ECU 3. When the vehicle speed SPD is not zero (step 40: NO), the power supply control processing is terminated without performing the processing of the following steps.

If the vehicle speed SPD is zero (step 40: YES), the operation proceeds to step 50, in which an engine speed NE is zero (0) or not is determined based on engine speed information inputted from the engine ECU 5. When the engine speed NE is not zero (step 50: NO), the power supply control processing is terminated without performing the processing of the following steps.

If the engine speed NE is zero (step 50: YES), the five conditions for step 10 to step 50 are all met. Then, the operation proceeds to step 60, in which whether that state has lasted for a predetermined time, T second, is determined. When the result of the determination is negative (step 60: NO), the operation returns to step 10 and the above determinations are repeated until a time of T seconds passes. When a state in which the five conditions for step 10 to step 50 are all met lasts for T seconds (step 60: YES), the operation proceeds to step 70, and the cancel pulse signal P2 is outputted. When any of the five conditions for step 10 to step 50 becomes unsatisfied before a time of T seconds has passed, the cancel pulse signal is not outputted. This is because the power supply control processing is continuously performed.

As described above, the power supply control processing illustrated in FIG. 2 provides the following advantage.

When the microcomputer 1a is automatically reset due to uncontrollable process or the like, the microcomputer 1a is prevented from outputting a cancel pulse signal without limitation even when it recovers from reset (released from reset). Thus, power supply to the power train system is prevented from being instantly stopped even though the vehicle is running. Further, when power supply is maintained in a state in which the vehicle is presumed to be parked, a cancel pulse signal is outputted to stop the power supply. Thus, battery rundown can be prevented.

Figure 3:
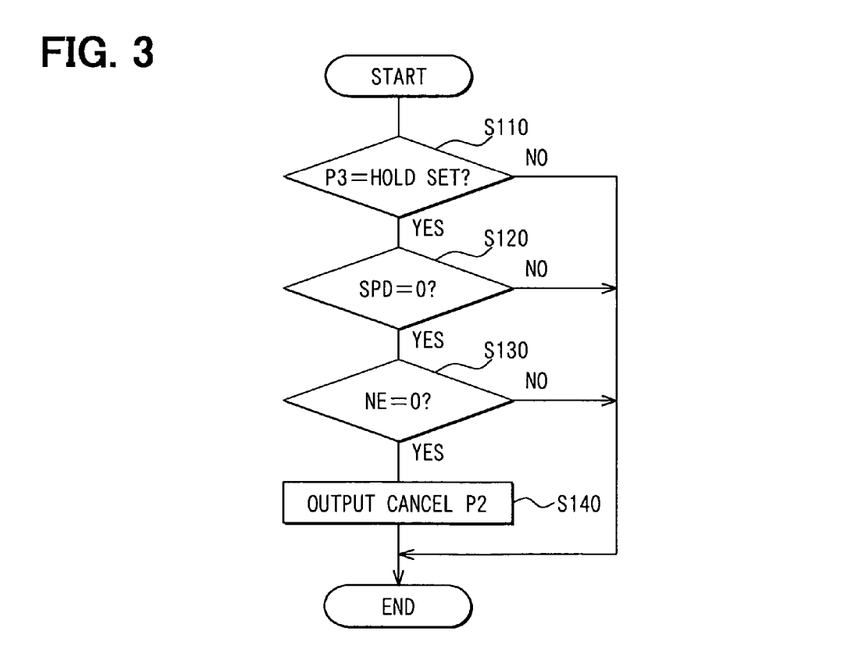
FIG. 3 is a flowchart illustrating power supply control processing carried out when the microcomputer is in sleep state in the first embodiment.

FIG. 3 is a flowchart illustrating power supply control processing performed when the microcomputer 1a is in the sleep state (low-power consumption state), for example, when the vehicle is parked.

The processing illustrated in FIG. 3 is performed at predetermined time intervals in sleep state. Since the control is intended not to excessively maintain unintentional power supply, for example, a frequency of once for several tens of minutes is acceptable.

This processing is performed on the assumption that when the microcomputer 1a transitions into sleep state, at least three conditions must have been met: output to the IG relays is OFF, vehicle speed SPD=0, and engine speed NE=0.

At step 110, whether hold set is detected or not is determined based on the status signal P3 inputted from the hold circuit 1b. The status signal P3 is a signal which indicates whether in hold set state or in cancel state, and the determination is made by inputting the status signal P3. When hold set is not detected (step 110: NO), driving current is not supplied from the start. Thus, the output of cancel pulse signal P3 itself is unnecessary. Consequently, the power supply control processing is terminated without performing the processing of the following steps.

If hold set is detected (step 110: YES), the operation proceeds to step 120, in which whether the vehicle speed SPD is zero (0) or not is determined based on vehicle speed information inputted from the meter ECU 3. When the vehicle speed SPD is not zero (step 120: NO), the power supply control processing is terminated without performing the processing of the following step.

If the vehicle speed is zero (step 120: YES), the operation proceeds to step 130, in which whether the engine speed NE is zero (0) or not is determined based on engine speed information inputted from the engine ECU 5. When the engine speed NE is not zero (step 130: NO), the power supply control processing is terminated without performing the processing of step 140.

If the engine speed NE is zero (step 130: YES), the three conditions for step 110 to step 130 are all met. Then, the operation proceeds to step 140, and the cancel pulse signal P2 is outputted.

The power supply control processing illustrated in FIG. 3 is periodically performed in sleep state. Thus, even when power is unintentionally supplied due to noise or the like after the microcomputer 1a transitions into sleep state, the cancel pulse signal P2 is outputted from the microcomputer 1a to the hold circuit 1b to stop the power supply. Therefore, battery rundown can be prevented.

The first embodiment may be modified as follows.

The hold circuit 1b provided in the power supply ECU 1 may be provided outside the power supply ECU 1.

The conditions for determinations at step 20 to step 50 may be reduced to, for example, two conditions (only step 40 and step 50). However, to prevent power supply from being suddenly stopped even though the vehicle is running, it is preferable that the number of pieces of information on which determinations are based should be increased. Therefore, it is preferable that the two conditions for step 20 and step 30, illustrated in FIG. 2, should be added to the determinations. In the case illustrated in FIG. 2, the condition that the state in which these conditions are met should last for a predetermined time is added to the determination at step 60. Therefore, more accurate determinations can be implemented.

Like step 60 in FIG. 2, the condition of "continuance for a predetermined time" may be added to the determinations in the power supply control processing performed in sleep state, illustrated in FIG. 3.

As information from external devices, other types of information may be used. For example, information on the position of the vehicle acquired from a navigation system can be used in determination. When the vehicle is in a parking lot, for example, there is a high possibility that the vehicle is parked. When the vehicle is in the parking space in the driver's own home, there is a higher possibility that the vehicle is parked. Therefore, when such a condition is met, stop of power supply can be controlled with higher certainty.

The information on the position of the vehicle may be acquired from an in-vehicle navigation system or acquired from an external information center or the like through in-vehicle communication equipment.

The present invention is also applicable to in-vehicle ECUs other than the power supply ECU. Further, the present invention is also applicable to ECUs which are not in-vehicle devices.

(Second Embodiment)

A power supply system 21 in the second embodiment is so designed as to control the state of passage of current through the feeder lines installed for supplying power to various in-vehicle devices mounted in vehicles.

Figure 4:
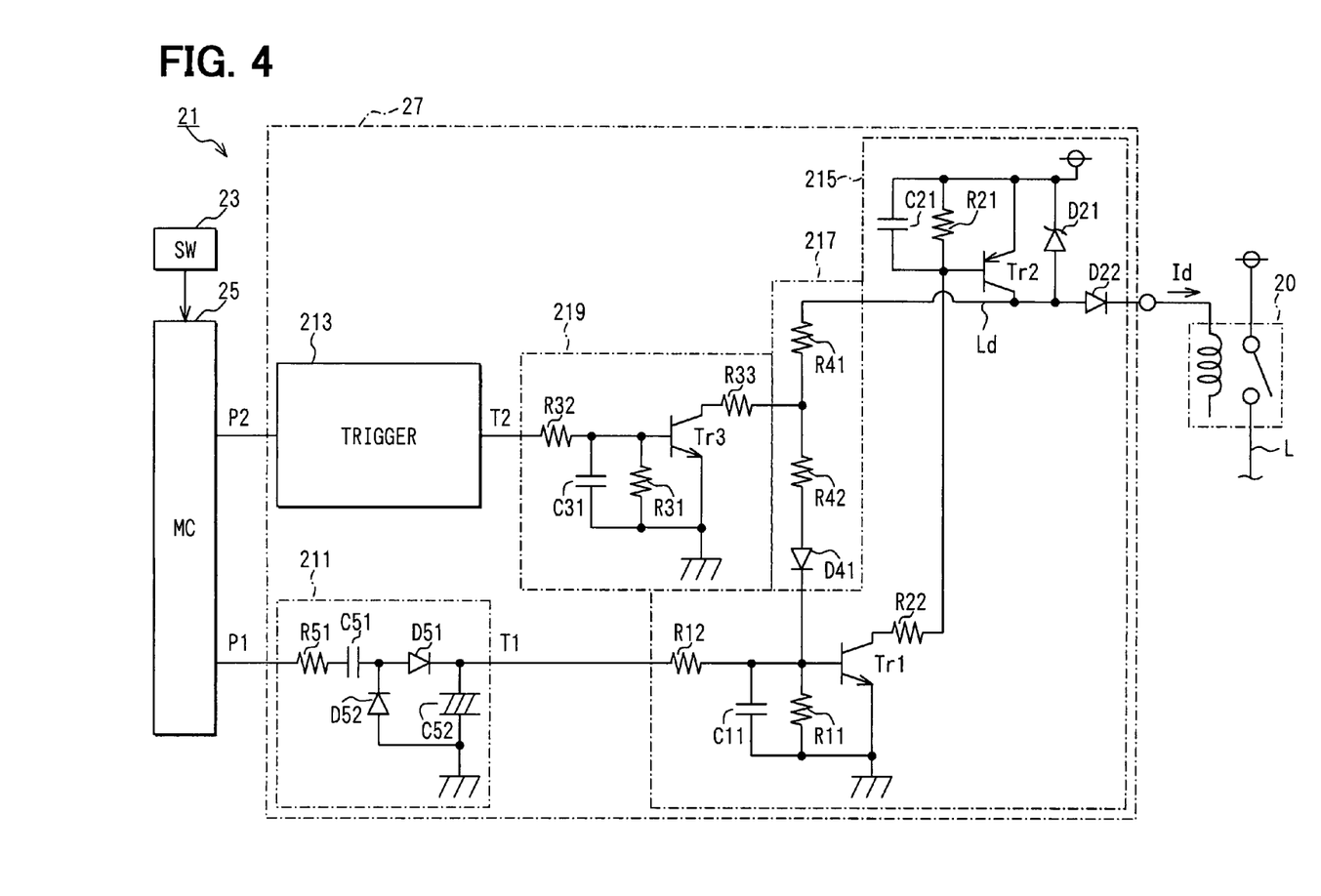
FIG. 4 is a block diagram of a power supply system as a second embodiment of the present invention.

As illustrated in FIG. 4, the power supply system 21 comprises: a pushbutton switch 23 for manually inputting commands instructing start or stop of power supply; a microcomputer 25 which has a port for outputting a hold pulse signal (a train of a plurality of pulses) P1 and a port for outputting a cancel pulse signal (a train of a plurality of pulses) P2 as well, and operates to alternately output the signals P1 and P2 each time the pushbutton switch 23 is pressed; and an electronic control unit (ECU) 27 which changes the state of supply of a driving current Id to a driving coil of a relay RLY 20 connected in series with an electric power feeder line L according to the hold pulse signal P1 or the cancel pulse signal P2 from the microcomputer 25.

With this construction, the driving current Id can be kept flowing even when both the hold pulse signal P1 and the cancel pulse signal P2 are outputted.

The ECU 27 comprises: a first trigger signal generation circuit 211 which generates a hold trigger signal T1 when the hold pulse signal P1 is inputted from the microcomputer 25; a second trigger signal generation circuit 213 which generates a cancel trigger signal T2 when the cancel pulse signal P2 is inputted from the microcomputer 25; a driving current supply circuit 215 which starts supplying the driving current Id when the hold trigger signal T1 is inputted (the active level is established); a holding current supply circuit 217 which supplies a holding current to keep supplying the driving current Id to the driving current supply circuit 215 after the hold trigger signal T1 disappears (the non-active level is reestablished); and a cancel circuit 219 which interrupts holding current to cause the driving current supply circuit 215 to stop supplying the driving current Id when the cancel trigger signal T2 is inputted.

The driving current supply circuit 215, holding current supply circuit 217, and cancel circuit 219 operate as a hold circuit, and the first and second trigger signal generation circuits operate as a trigger signal generation circuit.

The driving current supply circuit 215 comprises: an npn transistor Tr1 whose emitter is grounded and to the base of which the hold trigger signal T1 from the first trigger signal generation circuit 211 is applied through a resistor R12; and a pnp transistor Tr2 whose emitter is connected with a power line, whose collector is connected with a current supply line Ld for supplying the driving current Id to the driving coil of the relay RLY 20, and whose base is connected with the collector of the transistor Tr1 through a resistor R22. The driving current supply circuit 215 is so constructed that: when the transistor Tr1 is turned on by the hold trigger signal T1, the transistor Tr2 is also turned on to let the driving current Id flow through the current supply line Ld.

In the driving current supply circuit 215, various electronic elements are connected as follows: between the respective gates and emitters of the transistors Tr1 and Tr2, resistors and capacitors are connected which form filters for removing noise applied to the gates. With respect to the transistor Tr1, the resistor R12 and a capacitor C11 are connected. With respect to the transistor Tr2, the resistor R22 and a capacitor C21 are connected. Further, resistors R11 and R21 are connected between the respective gates and emitters of the transistors Tr1 and Tr2 for stabilizing the gate potential of the transistors Tr1 and Tr2. Further, a Zener diode D21 is connected between the emitter and collector of the transistor Tr2, for preventing excessive voltage from being applied to the transistor Tr2. A diode D22 is placed in the current supply line Ld for preventing the reverse flow of driving current Id.

The holding current supply circuit 217 is constructed by connecting a pair of resistors R41 and R42 and a diode D41 in series. One end of the circuit 217 is connected with the collector of the transistor Tr2 (current supply line Ld), and the other end is connected with the base of the transistor Tr1. However, the diode D41 is connected so that the current flows from the current supply line Ld toward the base of the transistor Tr1.

Thus, when driving current Id is not being supplied by the driving current supply circuit 215, that is, when the transistors Tr1 and Tr2 are off, the diode D41 is off as well. Therefore, the transistor Tr1 operates in accordance with the hold trigger signal T1. When the driving current Id is being supplied by the driving current supply circuit 215, that is, when the transistors Tr1 and Tr2 are on, the holding current flows from the current supply line Ld into the base of the transistor Tr1 through the holding current supply circuit 217. Thus, even when the hold trigger signal T1 disappears, the transistor Tr1 is kept on, and supply of the driving current Id is maintained.

The cancel circuit 219 comprises an npn transistor Tr3 whose emitter is grounded and to the base of which the cancel trigger signal T2 from the second trigger signal generation circuit 213 is applied through a resistor R32. The collector of the transistor Tr3 is connected through a resistor R33 with the common junction point between it and a pair of the resistors R41 and R42 which form the holding current supply circuit 217.

In the cancel circuit 219, the following elements are connected in parallel between the gate and the emitter of the transistor Tr3: a capacitor C31 forming a filter for removing noise applied to the gate, and a resistor R31 for stabilizing the gate potential.

Thus, when the transistor Tr3 is turned on by the cancel trigger signal T2, the anode-side potential of the diode D41 is lowered, and the diode D41 is turned off. When the signal level of the hold trigger signal T1 is not so high as to turn on the transistor Tr1 at this time, the transistor Tr1 is turned off. As a result, the transistor Tr2 is turned off as well, and supply of the driving current Id is stopped.

The first trigger signal generation circuit 211 comprises: an a.c. coupling capacitor C51 one end of which is connected with the port of the microcomputer 25 for outputting the hold pulse signal P1 through a resistor R51; a charging/discharging capacitor C52 which is charged by pulse signals supplied through the a.c. coupling capacitor C51; and diodes D51 and D52 which form such a charge supply path that the charging/discharging capacitor C52 is charged only at the rising edge of pulse signals. The first trigger signal generation circuit 211 is so connected as to supply the hold trigger signal T1 whose signal level is equal to charging voltage for the charging/discharging capacitor C52 to the transistor Tr1 in the driving current supply circuit 215.

The construction of the second trigger signal generation circuit 213 is similar to the first trigger signal generation circuit 211. The second trigger signal generation circuit 213 is so connected as to supply the cancel trigger signal T2 whose signal level is equal to charging voltage for the charging/discharging capacitor C52 to the transistor Tr3 in the cancel circuit 219.

In the trigger signal generation circuits 211 and 213, the charging/discharging capacitor C52 is charged and discharged as follows: it is charged at the rising edge of pulse signals from the microcomputer 25. The electric charges charged therein are gradually discharged through the resistors R11 and R12 and the transistor Tr1 in the case of the trigger signal generation circuit 211, or through the resistors R31 and R32 and the transistor Tr3 in the case of the trigger signal generation circuit 213. Therefore, when the next pulse is inputted before the electric charges in the capacitor C52 are completely discharged, the following takes place. The magnitude of charging voltage for the charging/discharging capacitor C52 becomes that corresponding to the pulse period (pulse frequency) of the inputted pulse signal.

That is, the trigger signal generation circuits 211 and 213 operate as a frequency/voltage (F/V) conversion circuits. The resistors R11 and R12 and transistor Tr1 and the resistors R31 and R32 and the transistor Tr2 correspond to charge/discharge circuits.

Figure 5:
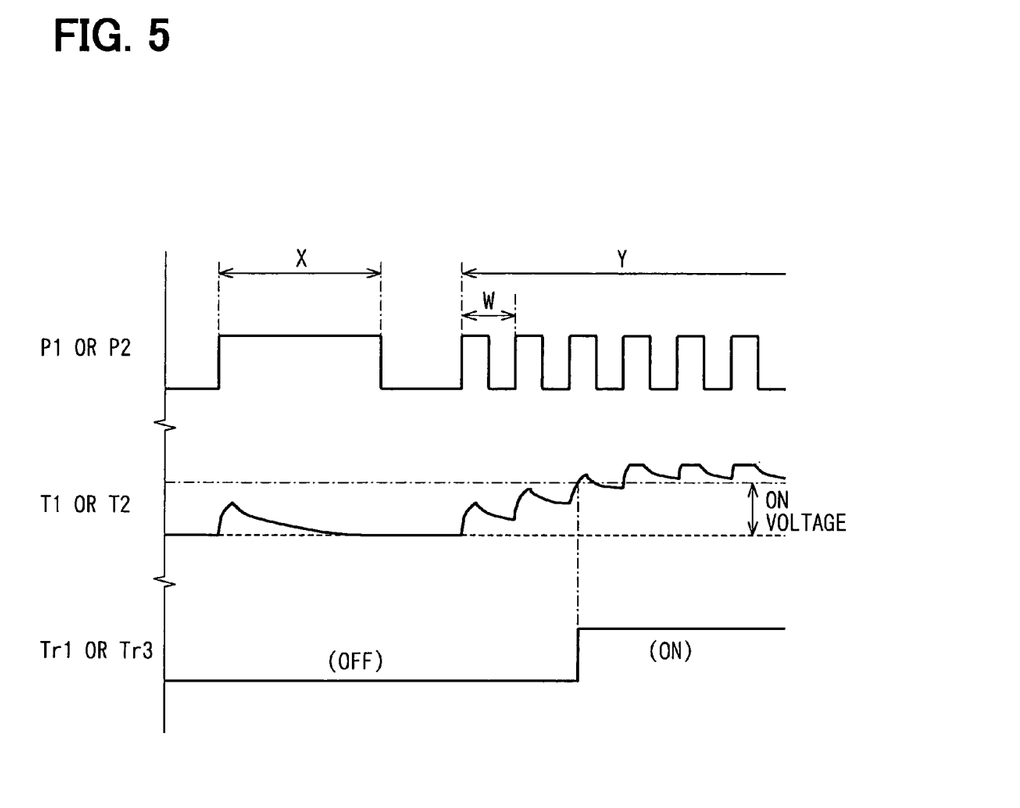
FIG. 5 is a timing chart illustrating the operation of the trigger signal generation circuit in the second embodiment.

However, the capacitance of the charging/discharging capacitor C52 is set based on the amount of discharge which is determined by the amount of charging by one pulse signal and the resistance value of the resistors R11, R12, R31, and R32 so that the following takes place: as illustrated in FIG. 5, when a preset number N of pulses (N=3 in the figure) are inputted at a predetermined pulse interval W, the charging voltage exceeds an ON voltage at which the transistors Tr1 or Tr3 is turned on.

The trigger signals T1 and T2 generated by the trigger signal generation circuits 211 and 213 are so constructed that: when the preset number N or more of pulses are inputted within a preset period (W×N), they reach the ON voltage of the transistors Tr1 and Tr3. The microcomputer 25 is so constructed as to output the hold pulse signal P1 and the cancel pulse signal P2 composed of N or more pulses which continue at the interval of W or less based on the foregoing.

Therefore, when any port of the microcomputer 25 is fixed at the active level (high level in this case) due to failure or erroneous output (period X in FIG. 5), the capacitor C52 is charged at the first rising edge. However, it is thereafter simply discharged because there is not an input of the next successive pulse, and thus the ON voltage is not reached. This is the same with cases where sporadic pulses the number of which is below the preset number N of pieces are inputted in a preset period (W×N).

If pulse signals P1 or P2 is outputted from the microcomputer 25 (period Y in FIG. 5), the charging/discharging capacitor C52 is charged again and again by successive pulses. Therefore, when the preset number N of pulses are inputted, the ON voltage is reached, and the transistors Tr1 or Tr3 can be turned on.

The power supply system 21 in this embodiment is so constructed that the hold trigger signal T1 or the cancel trigger signal T2 for changing the state of supply of the driving current Id is not generated unless the following situation takes place: the preset number N or more of pulses are inputted to the first or second trigger signal generation circuit 211 or 213 within the preset period (W×N).

Therefore, in the power supply system 21, the state held by the ECU 27 (the state of supply of the driving current Id in this case) is not changed. It is unchanged not only when an output port of the microcomputer 25 is fixed at any level due to failure or the like. It is unchanged also when sporadic pulses (the pulses the number of which does not reach a preset number of pieces within a preset period), produced by noise or the like, are inputted.

That is, the state held by the ECU 27 is changed only when the user operates the pushbutton switch 23. It is not changed by any other factor against the user's intention. Therefore, when the state of power supply to some equipment is controlled by the above power supply system 21, the reliability and safety of the equipment can be ensured.

(Third Embodiment)

Figure 6:
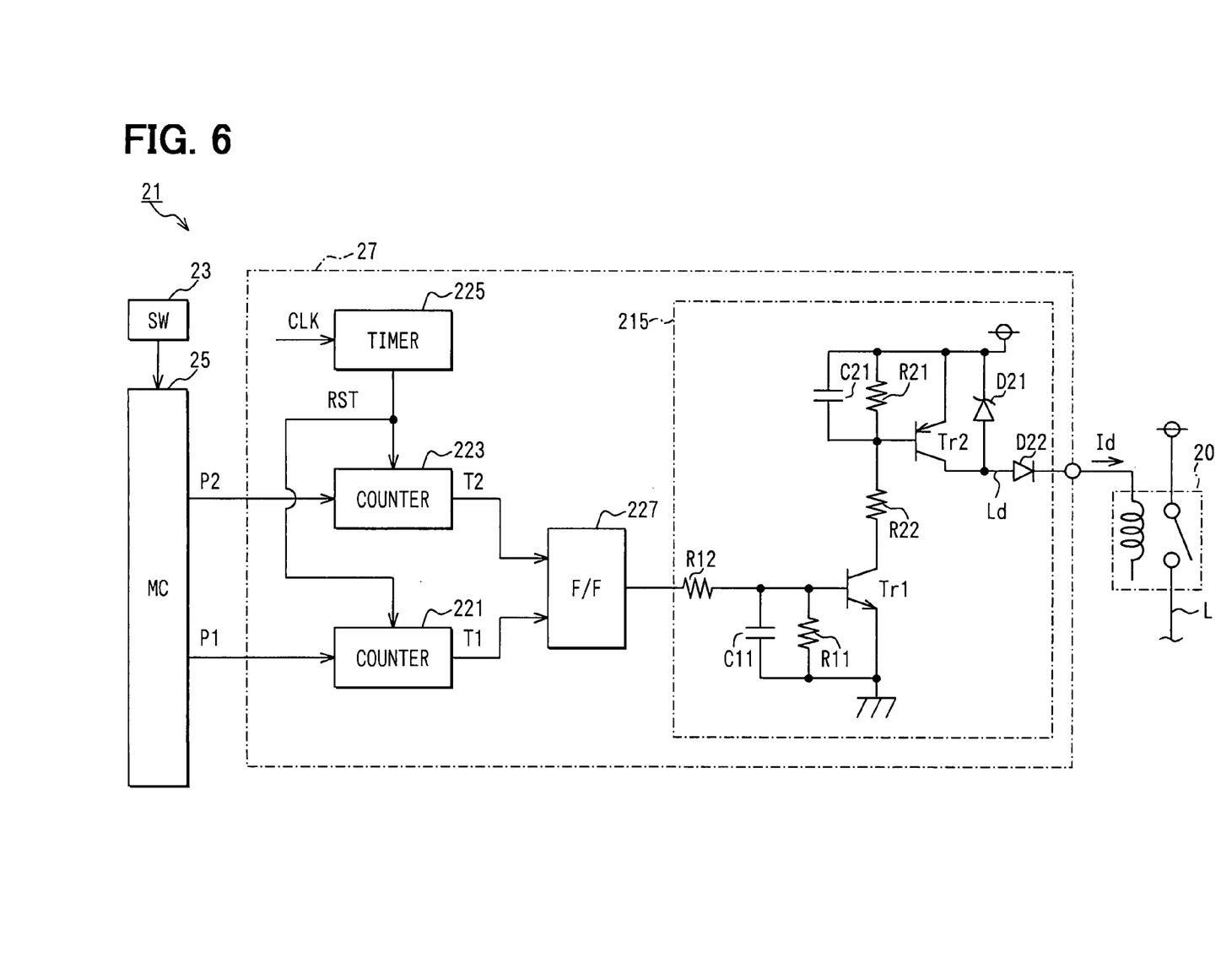
FIG. 6 is a block diagram of a power supply system as a third embodiment of the present invention.

A power supply system 21 in the third embodiment is different from the power supply system 21 in the second embodiment only in part of the configuration of an ECU 27.

As illustrated in FIG. 6, the ECU 27 in the power supply system 21 comprises in addition to the driving current supply circuit 215; a first counter 221 which counts the number of pulses of hold pulse signal P1 outputted from the microcomputer 25 and generates the hold trigger signal T1 when the count reaches a preset value; a second counter 223 which counts the number of pulses of the cancel pulse signal P2 outputted from the microcomputer 25 and outputs the cancel trigger signal T2 when the count reaches a preset value; a free-run timer 225 which operates in accordance with system clock CLK, and periodically generates a reset signal RST for resetting the counters 221 and 223 each time a certain period has passed; and an RS flip-flop circuit 227 which supplies a driving signal to the transistor Tr1 in the driving current supply circuit 215. The driving signal is brought into the active level at which the transistor Tr1 is turned on, when the hold trigger signal T1 is inputted. It is brought into the non-active level at which the transistor Tr2 is turned off, when the cancel trigger signal T2 is inputted.

In this embodiment, the driving current supply circuit 215 and the RS flip-flop circuit 227 operates as a hold circuit, and the counters 221 and 223 and the free-run timer 225 operates as a trigger signal generation circuit.

In the ECU 27, the state of supply of the driving current Id is changed in accordance with the signal level of driving signals outputted from the RS flip-flop circuit 227. The trigger signals T1 and T2 which change the signal level of the driving signals are generated only when the above preset number of or more pulse signals are inputted within the certain period (the reset period of the counters 221 and 223).

The microcomputer 25 is so constructed as to output such hold pulse signals P1 and cancel pulse signals P2 that the conditions for generating the trigger signals T1 and T2 will be met.

The power supply system 21 thus produces the same operation and effect as the power supply system 21 in the second embodiment does. All the parts of the ECU 27 other than the driving current supply circuit 215 are constructed of logic circuit. Therefore, the logic circuit portions can be realized using semiconductor integrated circuits, and the size of the system can be reduced.

In this embodiment, the counters 221 and 223 are connected directly with the ports of the microcomputer 25. However, the present invention may be constructed so that the counters are connected through a filter circuit for noise removal or a gate circuit.

The filter circuits C11, C21, and C31, the protection circuits D21 and D22, and the resistors R11 and R31 for stabilizing gate potential are used as required. Therefore, they may be omitted.

In the second embodiment and the third embodiment, the microcomputer 25 may be provided in the ECU 27 in the similar manner as in the first embodiment. The hold circuit and the trigger signal generation circuits in the second and the third embodiment may be applied to the first embodiment.

The present invention is also applicable to in-vehicle ECUs other than the power supply ECU. Further, the present invention is also applicable to ECUs which are not in-vehicle devices.

What is claimed is:

1. An electronic control unit that receives information from external devices and outputs control signals to a controlled object, comprising:
    a microcomputer including;
        a state propriety determination means for making a determination on a propriety of a state of a control signal outputted to the controlled object based on information from the external devices, and
        a signal state control means for carrying out control so as to bring the control signal into appropriate state when the state of the control signal is determined inappropriate by the state propriety determination means; and
    a hold circuit that holds and changes a signal level of the control signal and outputs a state signal indicative of the signal level,
    wherein the microcomputer is constructed to produce a hold signal or a cancel signal to the hold circuit thereby to change the signal level of the control signal outputted to the controlled object, and
    wherein the microcomputer is constructed to detect the state of the control signal based on the state signal outputted from the hold circuit.

2. The electronic control unit according to claim 1, wherein the state propriety determination means makes the determination when the microcomputer is released from reset.

3. The electronic control unit according to claim 2, wherein the state propriety determination means makes a determination of impropriety only when a state in which a predetermined inappropriate condition of the output state signal of the hold circuit lasts for a predetermined time.

4. The electronic control unit according to claim 1, wherein the state propriety determination means makes the determination periodically when the microcomputer is in sleep state.

5. The electronic control unit according to claim 1, wherein the number of the information used in the state propriety determination means to determine the state inappropriate is different between a sleep mode and a non-sleep mode of the microcomputer.

6. The electronic control unit according to claim 1, wherein the information includes at least one of a vehicle speed and an engine speed.

7. The electronic control unit according to claim 6, wherein the controlled object is a power supply device of an in-vehicle battery.

8. The electronic control unit according to claim 7, wherein: the information includes a parameter effective in inferring that the vehicle is parked; and
    the signal state control means controls the control signal to stop power supply, when it is inferred that the vehicle is parked based on the parameter but the state propriety determination means determines that the power is kept supplied.

9. The electronic control unit according to claim 1, further comprising:
    a program stored on a medium readable by the microcomputer, the program for causing the microcomputer to:
    execute one or more functions associated with the state propriety determination means and the signal state control means;
    receive the information from the external devices; and
    output the control signals to the controlled object.

10. An electronic control unit comprising:
    a hold circuit which changes a signal level in response to an input of a trigger signal and holds the signal level; and
    a trigger signal generation circuit which generates the trigger signal when a preset number or more of pulses are inputted within a preset period,
    wherein:
        the pulse is applied from a microcomputer mounted in a vehicle, and
        the output of the hold circuit is used as a control signal for controlling a state of passage of current through power feeder lines provided in the vehicle.

11. The electronic control unit according to claim 10, wherein:
    the hold circuit is provided with a plurality of input terminals and the signal level held when the trigger signal is inputted is different from input terminal to input terminal; and
    the trigger signal generation circuit is provided for each of the input terminals.

12. The electronic control unit according to claim 10, wherein:
    the trigger signal generation circuit includes a frequency/voltage conversion circuit which generates an output signal having a signal level corresponding to a pulse interval of the pulses; and
    the output signal from the frequency/voltage conversion circuit is used as the trigger signal.

13. The electronic control unit according to claim 12, wherein the frequency/voltage conversion circuit includes:
 a capacitor which is charged by the pulse; and
 a discharge circuit which discharges the capacitor at a certain rate, thereby generating the output signal having a signal level corresponding to a charging voltage of the capacitor.

14. The electronic control unit according to claim 10, wherein the trigger signal generation circuit includes:
 a counter which counts the pulse inputted and generates the trigger signal when a count reaches a preset threshold value; and
 a free-run timer which generates a signal for resetting the counter at a predetermined time interval.

15. A method of controlling an electric power supply in a vehicle having a microcomputer, a hold circuit and an electric power supply relay, the hold circuit holding a relay condition in response to a hold signal generated by the microcomputer, the method comprising:
 determining, based on a hold set signal generated from the hold circuit, whether the relay condition is held by the hold circuit;
 determining whether a vehicle speed and an engine speed are zero; and
 generating a cancel signal from the microcomputer to the hold circuit to thereby cancel the hold condition of the relay by the hold circuit, when the determining steps determine that the relay is in the hold set condition and the vehicle speed and the engine speed are zero.

16. An electronic control unit that receives information from external devices and outputs control signals to a controlled object, comprising:
 a microcomputer including;
  a state propriety determination means which makes determination on a propriety of a state of a control signal outputted to the controlled object based on information from the external devices, and
  a signal state control means which carries out control so as to bring the control signal into appropriate state when the state of the control signal is determined inappropriate by the state propriety determination means,
 wherein the state propriety determination means makes the determination periodically when the microcomputer is in sleep state.

17. An electronic control unit that receives information from external devices and outputs control signals to a controlled object, comprising:
 a microcomputer including;
  a state propriety determination means which makes determination on a propriety of a state of a control signal outputted to the controlled object based on information from the external devices, and
  a signal state control means which carries out control so as to bring the control signal into appropriate state when the state of the control signal is determined inappropriate by the state propriety determination means,
 wherein the number of the information used in the state propriety determination means to determine the state inappropriate is different between a sleep mode and a non-sleep mode of the microcomputer.

18. An electronic control unit that receives information from external devices and outputs control signals to a controlled object, comprising:
 a microcomputer including;
  a state propriety determination means which makes determination on a propriety of a state of a control signal outputted to the controlled object based on information from the external devices, and
  a signal state control means which carries out control so as to bring the control signal into appropriate state when the state of the control signal is determined inappropriate by the state propriety determination means,
 wherein the information includes at least one of a vehicle speed and an engine speed.

19. An electronic control unit comprising:
 a hold circuit which changes a signal level in response to an input of a trigger signal and holds the signal level; and
 a trigger signal generation circuit which generates the trigger signal when a preset number or more of pulses are inputted within a preset period,
 wherein:
  the trigger signal generation circuit includes a frequency/voltage conversion circuit including a capacitor charged by the pulse and a discharge circuit discharging the capacitor at a certain rate thereby generating the output signal having a signal level corresponding to a charging voltage of the capacitor, the frequency/voltage conversion circuit generating an output signal having a signal level corresponding to a pulse interval of the pulses, and
  the output signal from the frequency/voltage conversion circuit is used as the trigger signal.

* * * * *